United States Patent [19]

Glisson et al.

[11] 4,389,546
[45] Jun. 21, 1983

[54] DIGITAL ANNOUNCEMENT SYSTEM INCLUDING REMOTE LOADING AND INTERROGATION

[75] Inventors: David Glisson, Lawrenceville; Gerald Huber, Snellville; Bruce Biskey, Norcross, all of Ga.

[73] Assignee: The Audichron Company, Atlanta, Ga.

[21] Appl. No.: 246,733

[22] Filed: Mar. 23, 1981

[51] Int. Cl.³ ............... H04M 3/50; H04M 15/00
[52] U.S. Cl. ................... 179/18 B; 179/2 A
[58] Field of Search ............... 179/18 B, 18 ES, 6.1, 179/6.05, 6.03, 6.04, 6.17, 27 FG, 1 SM, 1 B, 2 A, 2 R, 2 TC; 360/12, 32

[56] References Cited

U.S. PATENT DOCUMENTS

| | | | |
|---|---|---|---|
| 4,124,773 | 11/1978 | Elkins | 179/2 A |
| 4,229,624 | 10/1980 | Haben et al. | 179/18 E |
| 4,255,618 | 3/1981 | Danner et al. | 179/1 B |
| 4,277,649 | 7/1981 | Sheinbein | 179/18 B |

OTHER PUBLICATIONS

"New Custom Calling Services", by Bergland et al., *International Switching Symposium*, Paris, May 11, 1979, pp. 1-7.

Primary Examiner—Thomas W. Brown
Attorney, Agent, or Firm—Jones & Askew

[57] ABSTRACT

An automatic message, time and temperature announcement system wherein the signals to be announced are stored in digitized form in a random access memory (32). Under control of a CPU (15), blocks of digitized speech signals are provided to a FIFO (35) and from there to a CVSD digital to analog converter (37), the output of which is coupled (41) to a plurality of telephone trunks (42). A digital counter timer peripheral (26) is used to maintain a count of the time of day (32) and the frequency output (49) of a voltage to frequency converter (48) connected to a temperature sensor (40). Loading of digitized speech signals, correction factors for time of day, and other controls may be accomplished remotely through a data link (27, 30) from a standard voice grade telephone line (31).

2 Claims, 6 Drawing Figures

Fig_3

Fig_5

Fig. 4

DIGITAL ANNOUNCEMENT SYSTEM INCLUDING REMOTE LOADING AND INTERROGATION

TECHNICAL FIELD

The present invention relates to automatic announcement apparatus particularly appropriate for connection to telephone lines, and is more specifically directed to an announcement system which stores announcements in digitized form which may be altered from a remote location by loading new data into the memory storing the announcement.

BACKGROUND OF THE INVENTION

The present invention relates to an improvement in automatic announcement systems particularly adapted to be connected to telephone trunks and to automatically deliver announcements in response to incoming calls on the trunks. In recent years such announcement systems have become more sophisticated and provided to the subscriber a variety of options for providing announcements of information and advertising material to an incoming caller.

Typically, the user of such announcement systems will be a subscriber institution which wishes to provide a public service such as announcements of time of day or present temperature to an incoming caller. The subscriber has the system arranged so that the announcement of the information concerning time or temperature is preceded by a brief advertisement for the services or goods of the subscriber.

Previous systems for automatically providing time of day announcements have included a clock system which drives a register, either solid state or relay, to select the particular vocal announcements indicating the correct time of day. A common arrangement in previous systems has included a rotating magnetic drum with a plurality of vocabulary words appropriate for announcing numerical quantities such as the time of day recorded in an analog fashion thereon. In response to the condition of the time of day register, a plurality of reproducing heads are lowered onto the drum in an appropriate sequence so that the individual string of reproduced words correctly reflects the time of day. For example, if the time of day is 3:05, the first head to be lowered would select the recording of the word "3" followed by selection of a track on the drum where the recording for "OH" followed by selection of the track containing the vocal recording of "5". More recent systems have included multiple recordings of some of the words with appropriate inflections for occurring at the beginning, middle or end of a time of day announcement.

Similarly, systems which include temperature announcement include a transducer which monitors the present outside temperature and controls an announcement of temperature in a similar manner.

The recording of the advertising material has simply been placed on a drum and precedes the sequence of the information announcement.

In practical use, the subscriber often wishes to change the nature of the announcement either by changing the voice character or the copy of the advertising material, in order to avoid boredom on the part of callers or to announce an advertisement for a new product or service. Heretofore it has been necessary to physically change the analog recording at the location of the announcement equipment, which usually involves recording a new drum at a remote location and physically delivering same to the announcement equipment.

Furthermore, upon changes in the time of day, most commonly occurring in the United States on the semiannual change between standard time and daylight savings time, it has been necessary for an attendant at the announcement equipment to physically change the contents of the time of day register at an appropriate time in order to reflect the new time of day. Needless to say, this puts an extreme workload on personnel servicing the announcement systems in a very short period of time concentrated around the dates upon which the time changes occur.

Furthermore, the necessity of recording new analog drums on specialized equipment and physically delivering same to location of announcement system involves considerable expense, and necessitates a delay between the time the decision to change is made and the time the new announcement is actually on line to be provided to callers. It will also be appreciated that previous systems have required the shutting down of the entire announcement system in order to make such a change in the drums for a new announced advertisement.

Furthermore, it is common for such announcement systems to maintain a count of the number of calls received, which count is used in billing subscribers who are leasing use of announcement equipment as well as informing subscribers or owners of the equipment of its effectiveness by knowing the number of calls during any given time period. These call counts are maintained on counters in the announcement systems, and must be read by periodic inspection of the system.

Thus, while modern prior art announcement systems have been developed which dependably deliver natural-sounding announcements of both advertising material and information such as temperature and time of day, any changes to the announcement have required physical transportation of new recorded material from a remote recording location to the actual location of the announcement system. It has also required visual inspection of counting registers at the site of the announcement equipment to monitor the traffic.

Previous announcement systems, in order to minimize necessary maintenance trips to the equipment, have also used very accurate and very expensive oven-controlled crystals in an oscillator circuit for maintaining accurately the time of day clock. Such precise and expense oven-controlled crystals or similar arrangements have been used because, in the past, it has been considered cost effective to invest initially in a highly accurate system in order to avoid the expense of repeated service trips to the location of the announcement equipment in order to adjust the time-of-day clock.

It will therefore be appreciated by those skilled in the art that it is desirable to provide an automatic announcement system in which the above noted service requirements including change of announcement, change of voice character, change of time of day, and interrogation of registers reflecting traffic through the system, may be accomplished remotely without the requirement of having service personnel physically attend to the announcement equipment at its situs.

SUMMARY OF THE INVENTION

The present invention overcomes the above-noted drawbacks in the prior art by providing automatic announcements of advertising material, time of day, and temperature in which the above-noted routine service or change operations may be performed remotely and preferably over a standard voice-grade telephone line. In order to maintain the necessary high quality of speech provided as output of the announcement system, the present invention employs digitized speech signals which are stored in a vocabulary memory and converted from their digital form to analog form to provide the announcements. By employing digitized vocabulary signals, the attendant mechanical wear and relative lack of reliability of rotating analog recording media are eliminated. Furthermore, the present invention provides for the remote loading of the memory storing the digitized vocabulary signals over a voice grade telephone line in a fashion which prevents the normal frequency and noise limitations of the telephone line from affecting the quality of speech ultimately provided to the incoming caller.

Furthermore, the present invention provides apparatus for interrogating the traffic count registers of the announcement system remotely, and preferably over the same voice grade telephone line, as well as providing a novel and convenient apparatus for changing the contents of the time of day register upon changes between standard and daylight savings times.

Additionally, the remote servicing features of the present invention allow much less expensive clock arrangements to be used to maintain the time of day standard, since the present invention provides remote apparatus for correcting both the time of day and any drift present in a clock oscillator used with the system. The ability to make such corrections remotely makes it both possible and desirable to use much less expensive crystal clocks than have heretofore been practical in time-of-day announcement systems.

Thus, it is an object of the present invention to overcome the above-cited drawbacks in servicing and interrogation of automatic announcement systems.

More particularly, it is an object of the present invention to provide an automatic announcement system for which most normal service operations may be performed remotely over a voice grade telephone line from one central remote location controlled by service personnel for the equipment.

It is a further object of the present invention to provide automatic announcement apparatus in which absolute changes of time of day as well as correction of drift of a clock apparatus may be made remotely without requiring trips by service personnel to the situs of the equipment.

It is a still further object of the present invention to provide apparatus which may be remotely serviced only upon the provision by the servicing personnel of predetermined signal sequences in order to obtain access to the system.

It is a still further object of the present invention to provide an automatic announcement system which may be interrogated remotely in order to ascertain the level of traffic through the system, the contents of its time-of-day registers, and the like.

It is a still further object of the present invention to provide high quality speech signals which may be transmitted from a remote location over a voice-grade telephone line and stored at the announcement equipment without suffering any degradation in quality over that available at the recording location.

That the present invention accomplishes these and other objects as well as overcoming the above-cited drawbacks of previous announcement systems will be appreciated from the description of the preferred embodiment contained hereinbelow.

DETAILED DESCRIPTION

The preferred embodiment of the present invention will be understood by reference to the accompanying drawing figures in which like numerals represent like elements.

Figure 1:
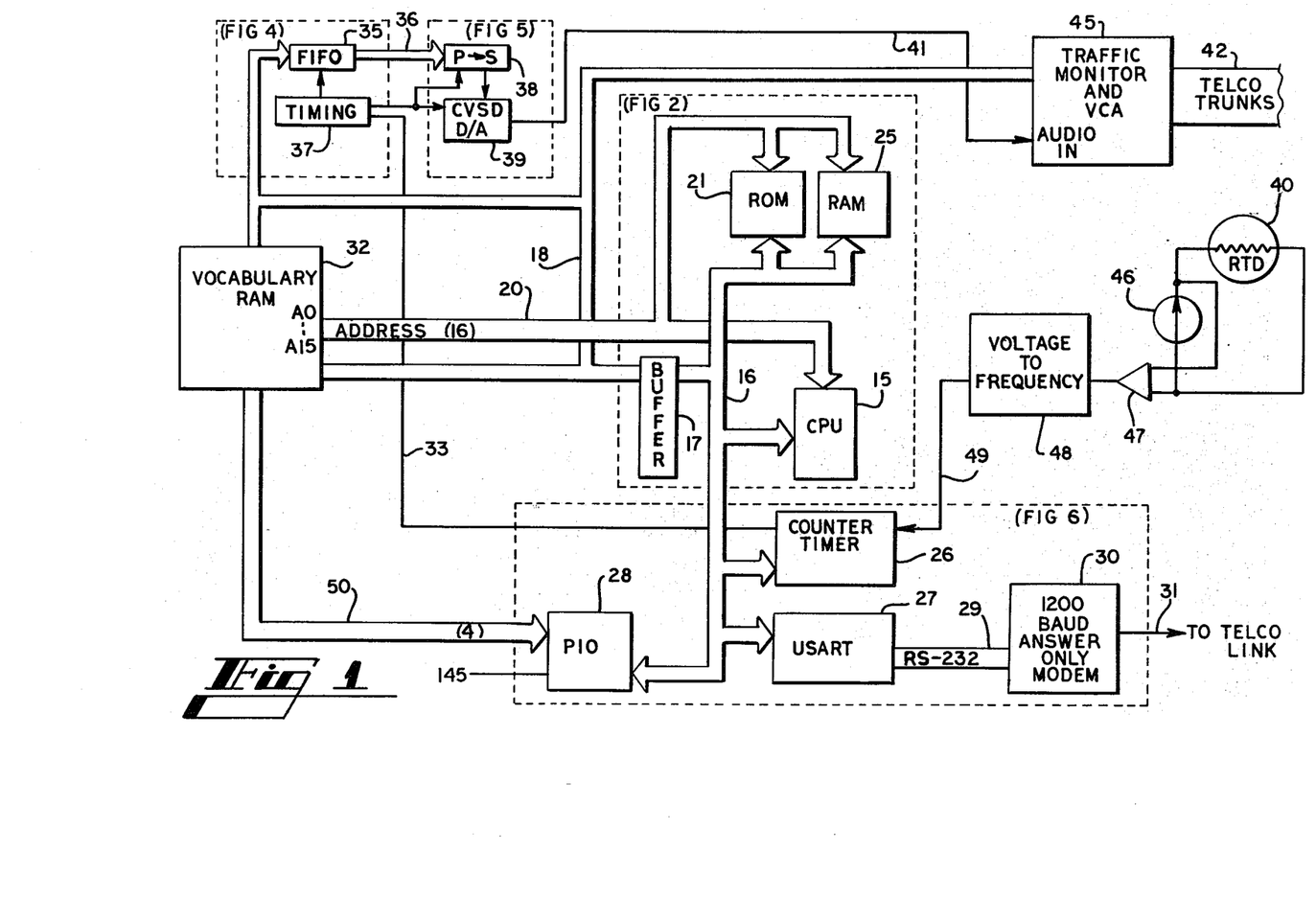
FIG. 1 is a block diagram of the preferred embodiment of the present invention.

A block diagram of the preferred embodiment is shown in FIG. 1 wherein it may be seen that the preferred embodiment is a digital system constructed around a central processing unit (CPU) 15 which controls the system. CPU 15 communicates through an internal eight bit data bus 16 which is extended through buffer 17 to an additional eight bit portion of the data bus 18. Also emanating from CPU 15 is an address bus 20 and a control bus (not shown in FIG. 1). The programming information for controlling the CPU is stored in a read only memory array 21. Random access memory 25 is used as a scratch pad memory and includes various registers described in further detail hereinbelow which are used to provide some of the novel features of the present invention. Also connected to CPU 15 is a counter/timer 26, a universal synchronous/asynchronous receiver transmitter (USART) 27, and a parallel input/output chip (PIO) 28.

USART 27 communicates via an RS232 link 29 to a 1200 baud answer only modem 30 which in turn is connected to a telephone trunk shown at 31.

Digitized vocabulary signals, which will be understood to be digitized speech, are stored in vocabulary RAM 32 which, in the preferred embodiment, comprises approximately 100K of eight bit bytes constructed from dynamic random access memories. At the preferred sampling rate of four kilohertz, vocabulary RAM 32 stores approximately 24½ seconds of speech. The output of vocabulary RAM 32 is provided to a FIFO register 35 which accepts blocks of data from vocabulary RAM 32 and provides them as an output on eight bit bus 36 in the well known first-in/first-out (FIFO) transfer arrangement.

FIFO 35 is controlled by a timing block shown as 37 which also provides timing signals to parallel to serial converter 38 and digital to analog converter 39, the output of which is provided along line 41 to a conventional voice connection arrangement for coupling of analog speech signals to one of a plurality of telephone trunks shown as 42. Also included in the preferred embodiment is a traffic monitor, shown as a part of block 45, which maintains a count, commonly referred to as the "peg count", of the number of calls received by the announcement system.

The preferred embodiment of the present invention uses a conventional resistance temperature device (RTD) 40 supplied from a constant current source 46 to transduce the outside temperature. In a conventional manner, the voltage across the output of RTD 40 has been measured by a high input impedance operational amplifier shown as 47 which drives a voltage to frequency converter 48, the output of which appears as a signal on line 49 having a frequency proportional to the temperature measured by RTD 40. Four dashed blocks are shown around various components of FIG. 1 with an indication of the particular one of the remaining drawing figures which shows the elements of these blocks in greater detail. Therefore, reference to FIG. 1 may be used to see where in the overall system the details shown in the remaining figures are located in the overall arrangement of the preferred embodiment.

Operation

Before describing the details of the structure of the present invention, an overview of the operation of the preferred embodiment will be given. When the preferred embodiment shown in FIG. 1 is installed, a plurality of telephone trunks 42 are connected to conventional voice connection arrangements (VCAs) shown at block 45 for responding to incoming calls on trunks 42 and connecting an audio signal path from line 41 to answered telephone trunks. Resistance temperature device 40 will be disposed in an appropriate location exposed to the outside in order that it may properly measure temperature. In addition, a telephone company trunk is connected to a switched access telephone line 31 from modem 30 which, in the preferred embodiment, is a dedicated line used only for communicating with modem 30. In the preferred embodiment, the encoding scheme for digitizing voice signals is the well-known continuously variable slope delta modulation (CVSD) technique, a species of delta modulation (which encodes the differences between successive samples rather than their absolute value) which is appropriate for encoding band limited human speech.

It is to be understood that the vocabulary for information announcements, i.e. the numbers to be announced in connection with time and temperature together with advertising announcements, are recorded and encoded at a remote location by the operator of the preferred embodiment. Upon initial installation of the system, a call from the system operator is originated on trunk 31 and answered by answer only 1200 baud modem 30. At the remote location where the digitized speech signals have been recorded and encoded, a predetermined sequence of signals comprising an access code must first be provided along trunk 31 to modem 30 before CPU 15 will allow any modification of the memories of the system to be made through modem 30. In the preferred embodiment, modem 30 is a half duplex answer only 1200 baud modem compatible with the Bell 202 modem.

It should be further appreciated that all communication to and from modem 30 along line 31 is preferably arranged to provide FSK encoded American standard code for information interchange (ASCII) so that communication with the system from the remote location may be effected by a dumb terminal. Provision of the correct access code along trunk 31 is converted in a conventional manner to signals in accordance with revised standard RS-232-C entitled "Interface Between Data Terminal Equipment and Data Communication Equipment Employing Serial Binary Data Interchange" promulgated by the Electronic Industries Association. The access code is then synchronized and converted to a parallel eight bit word in a conventional manner by USART 27 and the word is provided onto data bus 16. CPU 15 compares the access code provided by USART 27 with a proper access code stored in RAM 25 and, if the two are identical, allows further access to the system through modem 30.

When access has been gained, the operators at the remote location may then initiate a transfer of the CVSD encoded digitized vocabulary signals to be stored in vocabulary RAM 32. During this operation, CPU 15 controls the system to accept serial data from RS-232 link 29 through USART 27 and load the data through data bus 16 and 18 into vocabulary RAM 32, with CPU 15 controlling the addresses along address bus 20. Since, in the preferred embodiment, the sampling rate at which the original speech signals were digitized was four kilohertz for encoding into eight bit words, and modem 30 operates at 1200 baud, there is an approximately 50:1 ratio between time required to transmit digitized vocabulary signals through modem 30 and the actual length of audio message which may be reproduced by the signals. Thus it takes approximately one-half hour to completely load vocabulary RAM 32 through modem 30.

Of course, in most conventional environments for systems of this type, the half hour loading time represents a considerable time savings over that required to physically transfer and load analog recording drums from a recording studio remote location to the actual location of the announcement system.

Once vocabulary RAM 32 has been loaded, the operator at the remote location need only transmit a digitized signal from trunk 31 through modem 30 indicating the present time of day which is stored in a time of day register located in RAM 25. Upon completion of this operation, normal operation in response to incoming calls on trunks 42 may be started.

In response to an incoming call, the conventional VCA seizes one of trunks 42 and connects the trunk to an audio signal provided from line 41. Thus, the audio signals which will be present on line 41 are provided to the incoming caller. Under control of CPU 15, incoming calls on trunks 42 will be seized at an appropriate time so that the entire advertisement and information announcement may be heard by the caller.

In the preferred embodiment, CPU 15 controls the entire operation of the system including control of data buses 16 and 18, the transfer of digitized speech signals from vocabulary RAM 32 to FIFO 35, the time keeping as performed by counter timer 26, the storage of a numerical value representative of the temperature detected by RTD 40, and all communication functions through USART 27 and modem 30.

The precision oscillator of the preferred embodiment is located in timing block 37 and provides a timing signal along line 33 to counter timer chip 26. As will be explained in detail in connection with FIG. 6, the time of day is maintained by the preferred embodiment through counting the signal on line 33.

Similarly, under control of CPU 15, counter timer chip 26 periodically measures the frequency on line 49 to ascertain the outside temperature detected by RTD 40 and stores a number corresponding to this temperature in a register in RAM 25. When an announcement is being performed, reference to the time and temperature registers in RAM 25 is made by CPU 15 in order to control the particular selected words from vocabulary RAM 32 to be provided to D to A converter 39.

During normal operation when advertising, time, and temperature announcements are being provided, CPU 15, through control bus 18 and address bus 20 together with four bit page selecting address bus 50, selects appropriate digitized speech signals from vocabulary RAM 32 and provides them in blocks of data to FIFO 35 as eight bit parallel words on data bus 18 at a rate of approximately one megahertz. When FIFO 35 has received a sufficient block of data, CPU 15 returns to other operational routines while data is clocked out of FIFO 35 along bus 36 at a rate of approximately four kilohertz to be provided to D/A converter 39. Thus it will be appreciated that FIFO 36 performs a buffering function between vocabulary RAM 32 and D/A converter 39 by accepting data at a rate approximately two hundred and fifty times faster than data is clocked out of the FIFO. This allows the CPU to transfer blocks of data from vocabulary RAM 32 to FIFO 35 and then perform other control functions within the system until the FIFO indicates that more data is needed. Therefore CPU 15 provides a time shared control arrangement in which audio output signals may be continuously provided along line 41 but which requires only a small portion of the real time "attention" of the CPU to maintain a continuous audio stream.

It should be understood that at any time during operation of the preferred embodiment an incoming call on line 31 will be answered by modem 30, and if the proper access signal is provided along line 31 (corresponding to the access signal stored in RAM 25), various control functions may be initiated by CPU 15 in response to sequences of signals provided from trunk 31. For example, the information as to the peg count from traffic monitor block 45 may be read onto data bus 18 by CPU 15 and provided to USART 25 through RS-232 link 29 to modem 30, to be transmitted as FSK encoded ASCII signals back to the remote location controlling the system. Thus the present system provides for remote interrogation means for providing signals indicative of the contents of traffic usage or "peg count" registers.

Furthermore, in response to signals on trunk 31 preceded by the predetermined access code, the value of the time of day stored in the register in RAM 25 may be interrogated from the remote location at any time desired. Lastly, as explained hereinbefore, timing block 37 includes a much less expensive oscillator than the oven crystal controlled oscillators used heretofore to maintain accurate timekeeping. At any time desired, an operator at the remote location may interrogate the time of day register in RAM 25 to ascertain the time of day stored by the system. The oscillator and timing clock 37 has a nominally constant frequency for driving a divider chain which divides the signal by a scale to provide the timing output on line 32. Once the operator at the remote location has established a history of the accuracy of the timekeeping of the system, not only may the actual contents of the time of day register be changed to make them correct, but from trunk 31 a scale correction signal may be provided to the system which is stored in a register in RAM 25 to effectively change the scale of the divider associated with timing block 37. This adjustment of scale factor is under software control and is used to increment or decrement the count of the time of day register periodically in order to adjust for a history of drift from the oscillator and timing block 37. Thus, relatively inexpensive precision oscillators may be used to control timekeeping in the preferred embodiment, and since fine adjustments for drift may be made remotely through modem 30, there is no need to incur the additional expense of ultra precision oven controlled crystal oscillators.

DETAILS OF STRUCTURE

Figure 2:
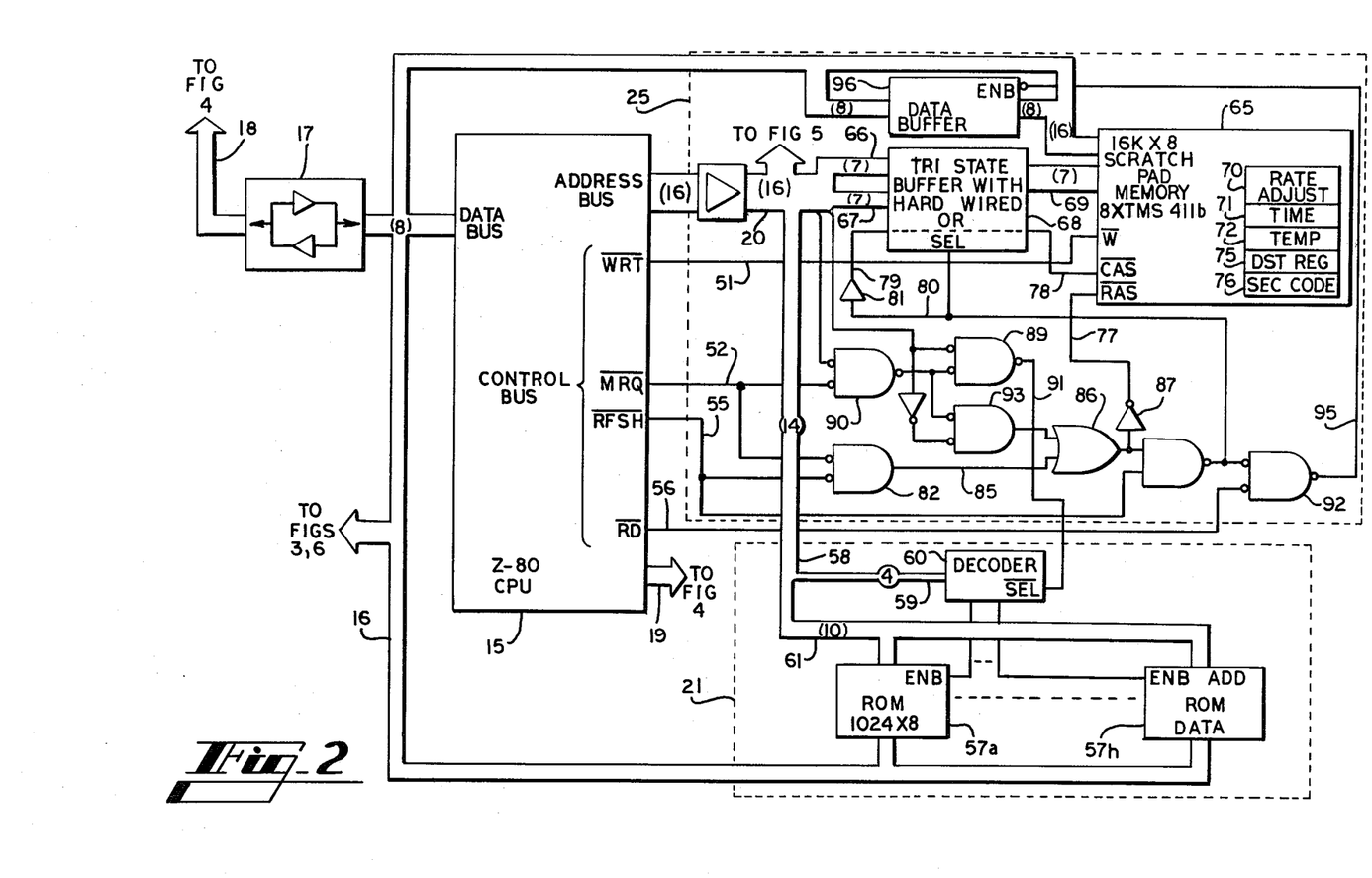
FIG. 2 is a diagram of the CPU and memory of the preferred embodiment.

With the foregoing overview of operation of the system in mind, the structure of the preferred embodiment will be described in greater detail. Turning to FIG. 2, it may be seen that the preferred embodiment incorporates a Z-80 CPU 15 currently manufactured by Zilog Corporation of Cupertino, California, and it will be apparent from the following description that much of the preferred embodiment is constructed around the Z-80 chip set as manufactured by Zilog. CPU 15 provides eight bit data bus 16 to components shown in FIG. 2, as well as providing a buffer 17 to drive a buffered remote version of the data bus 18 to peripheral devices. A sixteen bit address bus 20 is also controlled by CPU 15. Blocks 21 and 25 shown on FIG. 2 correspond to ROM 21 and RAM 25, respectively, shown in FIG. 1. It should also be understood that CPU 15 includes a control bus generally represented as 19, which should be understood also to include the negated forms of a write (WRT) line 51 counter, memory request (MREQ) line 52, refresh (RFSH) line 55, and read (RD) line 56.

The program controlling CPU 15 resides in ROM 21 which may be seen to comprise eight 1K by eight read only memories 57a–57h. A fourteen line bus 58 is tapped to address bus 20 to control the reading of program memory out of ROMs 57. Four of the fourteen lines 58 are brought out as a bus 59 to decoder 60, and the ten remaining lines of bus 58 are used as a ten bit address bus 61 for addressing ROMs 57. The data out of ROMs 57 is provided to data bus 16.

The preferred embodiment is also provided with a 16K by eight scratch pad memory 65 which is preferably embodied by eight TMS 4116 dynamic sixteen kilobit RAMs currently manufactured by Texas Instruments Corporation of Dallas, Texas. Fourteen lines of address bus 20 are provided as two seven-bit address buses 66 and 67 which are used to provide row and column address signals to scratch pad memory 65. Row and column buses 66 and 67 are provided through an arrangement of tristate buffers 68 with hard wired OR outputs, shown in greater detail in FIG. 3, which provide a composite seven bit address bus 69 to the 4116 chips. As will be explained in greater detail below, the hard-wired OR outputs provide a method of multiplexing the seven-bit address buses 66 and 67 for the 4116 RAMs, which only have seven address input lines.

Within scratch pad memory 65 are five registers which are used to provide some of the novel features of the present invention. These registers include rate adjust register 70, time of day register 71, temperature register 72, daylight savings time flag register 75, and security code register 76. As may be seen from FIG. 2, the write output (WRT) on line 51 from CPU 15 is directly connected to the write input of scratch pad memory 65. Line 80 controls a select input for the tristate buffered block 68 and is provided to time delaying buffer 81 to line 79, which manifests itself as line 78 to the column address strobe (CAS) line 78 of memory 65. Line 77 is connected to the row address strobe (RAS) input to the memory. The remaining steering logic shown on FIG. 2 controls the writing of data into scratch pad memory 65 and a reading of data therefrom together with the reading of data from ROMs 57.

The inputs to the steering logic include memory request (MRQ) line 52, refresh (RFSH) line 55, and read (RD) line 56. As will be known by those skilled in the art, the memory request line 52 from Z-80 CPU 15 goes low (active) to provide a signal indicating that a stable address for a read or write operation to or from memory is present on address bus 20. Read line 56 goes low (active) to indicate to any buffers connected to the bus that it is appropriate to read data onto data bus 16.

Refresh line 55 goes low to indicate that the seven least significant bits of the address bus contain a refresh address for dynamic RAMs in the system and that a concurrently present memory request signal on line 52 should be used to refresh the dynamic memories to avoid loss of data. Thus it will be appreciated that when refresh line 55 goes active, both inputs to inverted AND gate 82 will be low, causing a high to appear on line 85 which through OR gate 86, inverter 87, and NAND gate 88 causes a high to appear on line 78, deactivating the column address strobe and a low to appear on line 77, activating the row address strobe input to the TMS4116s. The refresh addresses for the rows of the 4116s, now enabled, are then sequentially addressed by the CPU 15, which will be understood to be a proper refresh sequence for this type of memory when no data is to be read out of scratch pad memory 65.

As may be ascertained from inspection of negative AND gates 89 and 90, the negated ROM select output which appears on line 91 is permitted to go low (active) only whenever memory request line 52 is active (low) and neither of the two most significant lines, A15 or A14, of address bus 20 are one. It will thus be appreciated that ROM 21 is mapped so that any address for which either of the two most significant lines of the address bus 20 are high will preclude reading from ROMs 57.

Memory access to the scratch pad memory RAMs 65 can be performed only when address line A15 is low and address line A14 is high, together with memory request line 52 from CPU 15 being active (low). This input combination, through negated-AND gate 90, inverted-AND gate 93, OR gate 86 and inverter 87, places a low-going pulse on row address strobe line 77. The 4116 RAMs then receive and latch in a seven-bit row address on address bus 69 through tristate buffer 68 which is quiescently enabled through NAND gate 88 on line 80 to select address bus 66. This address bus 66 consists of seven lines of system address bus 20, which represent row addresses in the RAMs.

The column addresses for the RAMs are provided on the seven least significant bits of address bus 20. When the input combination A15 low and A14 high is combined with memory request line 52 from CPU 15 being active (low), as in the preceding paragraph, a signal latching in row addresses appears at line 77. This same signal after passing through NAND gate 88 and appearing on select line 80 causes tristate buffer 68 to leave its quiescent state and select address bus 67. This address bus 67 consists of seven bits of address bus 20 which represent column addresses in the RAMs. After time delay 81, the signal on line 80 provides a low-going strobe to the RAMs on line 79, which is the column address strobe (CAS) line. It will thus be understood by those skilled in the art that the foregoing provides a method of transforming the memory request timing signals from CPU 15 into acceptable timing signals for accessing scratch pad memory RAMs 65.

It may further be appreciated that an active output on line 56 from the read output of CPU 15 when line 80 is low, will cause negated-AND gate 92 to provide a logical zero on line 95 which activates tristate buffers 96 to connect eight bits connected to the data out outputs of memory 65 to data bus 16.

Figures 3, 5:
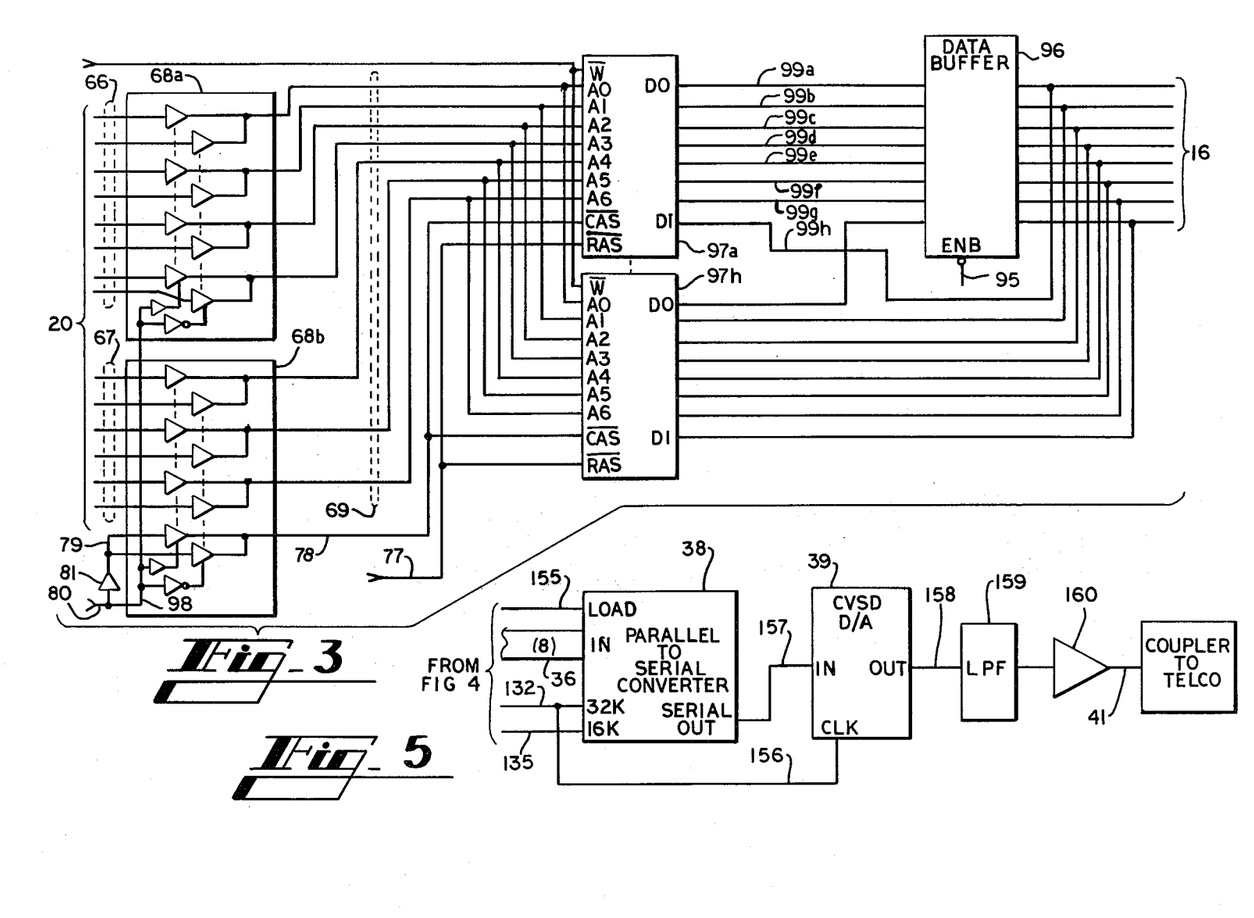
FIG. 3 is a detail showing the preferred arrangement for the random access memory of FIG. 2.
FIG. 5 is a diagram of the link between the output of the circuit of FIG. 4 and the telephone lines showing the digital to analog conversion of the preferred embodiment.

Turning next to FIG. 3, a detail of the particular arrangement for scratch pad memory 65 and tristate buffers with hard wired OR outputs 68 may be seen. As mentioned hereinabove, scratch pad memory 65 comprises eight 16K by one bit dynamic random access memories (RAM) of the type TMS 4116 currently manufactured by Texas Instruments. These memories are shown on FIG. 3 as memories 97a-97h. This type of memory has on-board seven bit row address latches and column address latches, and the seven address inputs A0-A6 for each of memories 97 is connected to sevenbit address bus 69. Tristate buffers 68 with hard wired OR outputs from FIG. 2 manifest themselves as buffers 68a and 68b on FIG. 3. It may be seen in FIG. 3 that line 77 is connected to all of the row address strobe (RAS) inputs of memories 97. Line 80 is connected to the select input at 98 of buffer 68, which will be understood to select either a first or second set of tristate buffers shown in the drawing. Tristate buffer arrays 68a and 68b are preferably embodied as low power Schottky TTL circuits of the type 74LS241. Through the operation of select input 98 it will be understood that when one set of the buffers in chip 68 is active, the remaining buffers will have their outputs in a high impedance state and thus it is possible to provide the hard wired OR connections from the outputs of two buffers on each of the lines of seven bit bus 69. Delay buffer 81 shown in FIG. 3 is used to provide time delay between the application of a signal at select input 98 from line 80 and the time at which the column address strobe on line 78 starts to go low. The time delay provided by delay buffer 81 assures that the appropriate buffers of arrays 68a and 68b have become active and are controlling bus 69 prior to the falling edge of the column address strobe on line 78 which latches the column address into each of RAMs 97.

Each of RAMs 97 includes a data-in input (DI) which may be seen from FIG. 3 to comprise one line of data bus 16. Similarly, each of RAMs 97 includes a single data output (DO) line shown as 99a-99h in FIG. 3 which are provided as the inputs to tristate buffers 96, so that when buffers 96 are enabled by line 95 the data on lines 99 will be read onto data bus 16.

It will thus be appreciated that while in the preferred embodiment registers 70-72, 75 and 76 are physically distributed throughout RAMs 97a-97h, these registers are treated by the preferred embodiment as being comprised of single eight bit words in memory 65.

As may be further seen from FIG. 2, the aforementioned rate adjust factor to adjust for drift in the nominal frequency of the oscillator controlling the clock of the present invention is stored in register 70 of memory 65. Also, under CPU control, the time of day signal is stored in a time-of-day register 71 which, as indicated hereinabove, may have its contents changed remotely from telephone trunk 31 (FIG. 1).

The value of the present temperature is detected by voltage-to-frequency converter 48 and counter timer 26 (FIG. 1), and is stored in temperature register 72. Similarly, the security code which provides the predetermined sequence of signals which must be received on trunk 31 after modem 30 has answered, is stored in security code register 76.

An additional register is provided in memory 65 which is indicated at 75 as the daylight savings time (DST) register. The provision of this feature provides one of the novel and important convenience aspects of the present invention. When DST register 75 is loaded, CPU 15 regularly accesses from ROM array 21 a short routine which determines if the next occurrence of a particular time of day indicated in DST register 75 has occurred in time of day register 71. Upon the next occurrence of the particular time of day indicated by the contents of register 75, CPU 15 will respond to a one bit flag which comprises a portion of DST register 75 either to increment or decrement by one the hour value stored in time register 71. Thus, the present invention provides a flag signal in register 75 which is loaded from an interface means comprising USART 27 and modem 30 to cause a predetermined change in time of day register 71, in response to the presence of the particular signal in DST register 75 upon the next occurrence of a particular value in time-of-day register 71.

Figure 4:
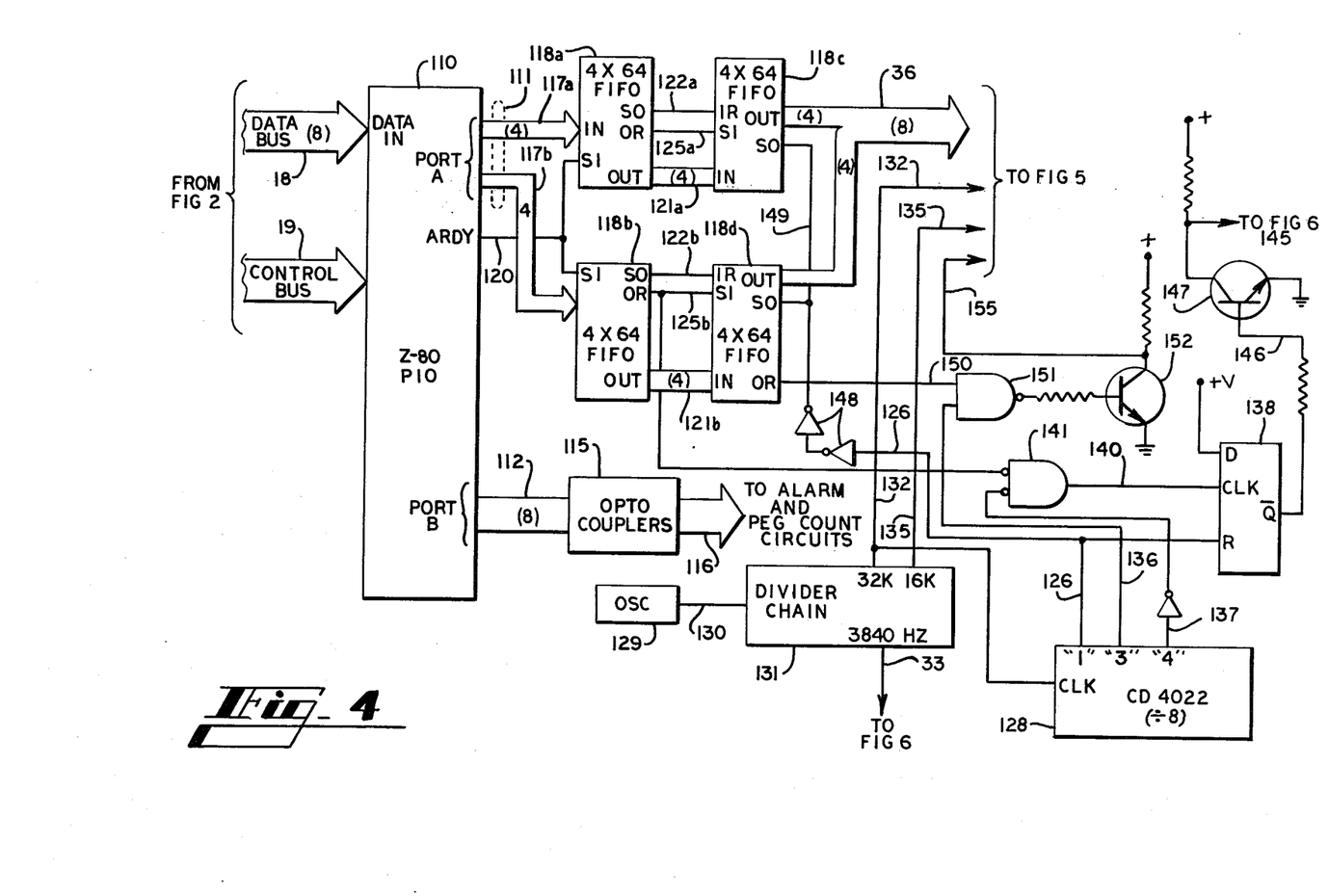
FIG. 4 is a diagram of the FIFO circuit for digitized vocabulary signals of the preferred embodiment.

Turning now to FIG. 4, the arrangement of FIFO circuit 35 and timing block 37 as shown in FIG. 1 is described. As stated hereinabove, the buffering of data provided by the FIFO circuit shown in FIG. 4 is one feature of the present invention which allows the continuous provision of digitized vocabulary signals to D/A converter 39 (FIG. 1), and still allows CPU 15 to control all functions of the preferred embodiment.

As may be seen in FIG. 4, the FIFO circuit is interfaced with CPU 15 via data bus 18 and control bus 19 through a Z-80 parallel input/output (PIO) chip 110 which will be understood to be one element of a standard Z-80 chip set. It should be appreciated that the connections on control bus 19 from CPU 15 are provided in the conventional manner as indicated by the manufacturer. The Z-80 PIO chip 110 includes two bidirectional eight bit ports 111 and 112. B port 112 as shown in FIG. 4 is coupled to an array of opticouplers 115 which is shown by bus 116 to be connected to conventional alarm circuits and the peg count circuits associated with traffic monitor and VCA block 45 (FIG. 1). Port 111, designated as port A, is divided into two four bit sections 117a and 117b and connected to the four bit inputs of four by 64-bit FIFO registers 118a and 118b. In the preferred embodiment, the FIFO registers are of type 3341 APC manufactured by Fairchild Semiconductor. The outputs of these FIFO registers are in turn connected to a pair of identical FIFO registers 118c and 118d, respectively. Therefore, FIFO registers 118 provide a composite eight bit wide by 128-word deep FIFO circuit.

It will further be appreciated that an A ready (ARDY) output is provided from PIO chip 110 on line 120 to indicate that stable data is available at the output of port A. Line 120 is connected to the SHIFT IN (SI) inputs of registers 118a and 118b. The outputs (OUT) of registers 118a and 118b are connected by four-bit buses 121a and 121b to the data inputs (IN) of registers 118c and 118d. The SHIFT OUT (SO) inputs of registers 118a and 118b are connected to the INPUT READY (IR) outputs of registers 118c and 118d. Similarly, the OUTPUT READY (OR) outputs of 118a and 118b are connected to the SI inputs of 118c and 118d. It will be appreciated by those skilled in the art that the connections on lines 121, 122, and 125 are conventional connections for cascading and increasing the depth of FIFO registers of the type shown.

It will thus be appreciated that when data trickles through register 118a and is available at the data outputs on bus 121a, lines 122 and 125 will begin to sequentially handshake to exchange data from register 118a to register 118c. Thus when the input of register 118c is prepared to accept another four-bit nibble, a strobe will be provided on line 122a which will shift out the most recent word on the data output of FIFO 118a. When this has been accomplished, the OR signal from 118a will strobe line 125a, indicating that a new word is available on bus 121a. The strobe on line 121a activates the SI input of 118c, thus shifting in the new word. This is followed by the second occurrence of the previously-mentioned strobe on the input ready (IR) output of 118c which repeats the cycle.

The A ready output from PIO chip 110 is used to strobe data into registers 118a and 118b as it becomes available at port A (111) from data bus 18. As mentioned hereinabove, when FIFO registers 118a–118d are being loaded from data bus 118, the data transfer occurs as parallel eight-bit bytes at a rate of approximately one megahertz.

The four bit data outputs of registers 118c and 118d are combined to an eight bit bus 36 shown in FIG. 4. The shifting out of old data from these outputs is controlled by line 126 from the "one" output of a divide-by-eight Johnson counter 128 which is preferably embodied as a type CD4022 currently manufactured by RCA.

Counter 128 is part of the dividing and timing chain shown as block 37 in FIG. 1. The master source for this timing chain is precision oscillator 129, which provides its output on line 130 to divider chain 131. Oscillator 129 is the aforementioned crystal controlled oscillator which, while precise, need not be of the precision low drift type formerly required for practical time of day announcement systems. Divider chain 131 divides down the signal from oscillator 129 and provides a 3840 hertz signal on line 32, which is provided to FIG. 6, and 32 kilohertz and 16 kilohertz signals which appear on lines 132 and 135, respectively. The 32 kilohertz signal drives the clock input of Johnson counter 128, and thus it will be appreciated that each of the outputs of counter 128 are four-kilohertz signals which appear on lines 126, 136 and 137 but which are skewed in time. It will also be appreciated that these four kilohertz signals have a duty cycle of approximately 0.13 since the counter divides by eight.

As may be seen from further inspection of FIG. 4, each complete eight-count cycle of counter 128 will provide sequential pulses on lines 126, 136, and 137. Delay flip-flop 138 is used to detect the condition of the entire FIFO array comprising 118a–118d being half empty. This condition may be detected by detecting the fact that FIFO register 118b is empty.

Flip-flop 138 is preferably a type 4013 CMOS flip-flop which includes a positive edge triggered clock and an asynchronous reset input connected to line 126 of counter 128.

It will be appreciated that in each complete cycle of Johnson counter 128, output "1" on line 126 goes high which has its edge sharpened by Schmitt trigger inverters 148 to provide a signal on line 149 to the SHIFT OUT (SO) inputs of registers 118c and 118d. This causes the most recent byte which appeared on line 36 to be shifted out of the outputs of registers 118c and 118d. The OUTPUT READY (OR) output of register 118d is connected by line 150 to one input of NAND gate 151, the other input of which is connected to line 136. Shortly after the most recent output is shifted out in response to a strobe on line 149, the OUTPUT READY output of register 118d will take line 150 high. When the next pulse occurs on line 136 from the "three" output of counter 128, NAND gate 151 will turn off transistor 152 providing a pulse on line 155 which, as will be set forth hereinbelow, causes the loading of the new word on bus 136 into serial to parallel converter 38 (FIG. 1, FIG. 5).

While the above-noted sequence has been taking place, a new word at the front end of register 118d will have been loaded and the most recent output of register 118b will be shifted out.

The next clock pulse on line 132 will cause the "four" output on line 137 of Johnson counter 128 to be pulsed, which provides a negative going pulse to NAND gate 141 thus enabling inverted-AND gate 141 to perform an inversion function between its input on line 142 and its output on line 140. During all "four" outputs from counter 128, line 140 will be held low due to the presence of a logical one on its input from line 137. Thus it will be appreciated that under these conditions, if the output ready line 125b from register 118b has not gone high after the most recent word has been shifted out, line 142 will be low when the "four" count of counter 128 is reached, thus causing a positive going strobe on line 140 clocking flip-flop 138. Under these conditions it will be appreciated that FIFO register 118b is empty and therefore the entire FIFO array is half empty. The clocking of flip-flop 138 causes a logical one to be clocked into the flip-flop which causes line 146 to go low, thus turning off transistor 147 and providing a positive signal on line 145 which is designated FIFO interrupt. Line 145 is connected (as explained hereinbelow) to PIO chip 28 (FIG. 1, FIG. 6) and generates an interrupt to CPU 15, indicating that the FIFO is half emtpy and that more data should be loaded.

In the event that FIFO register 118b still contains data during the above recited sequence, line 142 will be high when the "four" count of counter 128 is reached and no clock signal will be provided to line 140. As may be seen from the drawing, the asynchronous reset (R) of flip-flop 138 is activated each time the "1" count of counter 128 is reached, and thus the FIFO interrupt signal on line 145 will be removed upon the next occurrence of the "1" count of counter 128 when a word has rippled through to the output of register 118b.

Thus it will be appreciated that a FIFO interrupt signal is provided on ine 145 each time the entire FIFO array is half empty to indicate to the CPU that more data from vocabularly RAM 32 should be provided to the FIFO in order to assure continuous provision of the announcement signals. It will be further appreciated by those skilled in the art that the interrupt signal on line 145 is transmitted through PIO circuit 128 shown in FIG. 6 to CPU 15 in the conventional manner for the Z-80 chip set.

Turning to FIG. 5, the output arrangement from the FIFO of FIG. 4 is shown. Bus 36 and lines 132, 135 and 136 are provided to parallel-to-serial converter 38. Line 132, which carries the 32-kilohertz signal, is also connected via line 156 to a clock input of A/D converter 39. Each time line 155 goes high, indicating that an output word is ready from the FIFO under the "3" count of counter 128 (FIG. 4) has been reached, a new eight-bit word is loaded into converter 38 from bus 36. The timing signals on lines 132 and 135 control the serializing and shifting out of data from converter 38, so that each eight-bit word loaded into the converter appears as a serial eight bit stream on line 157 from the serial output of the converter. The serial output on line 157 is provided as the input to the continuously variable slope delta modulation (CVSD) D/A converter 39, the output of which appears as an analog audio signal on line 158. This signal is filtered by low pass filter 159 and provided to amplifier 160 which provides the output to line 41 which, as explained hereinbefore, provides the audio announcement signals to the voice connecting arrangement shown as 45 in FIG. 1, thus providing announcements to callers.

Figure 6:
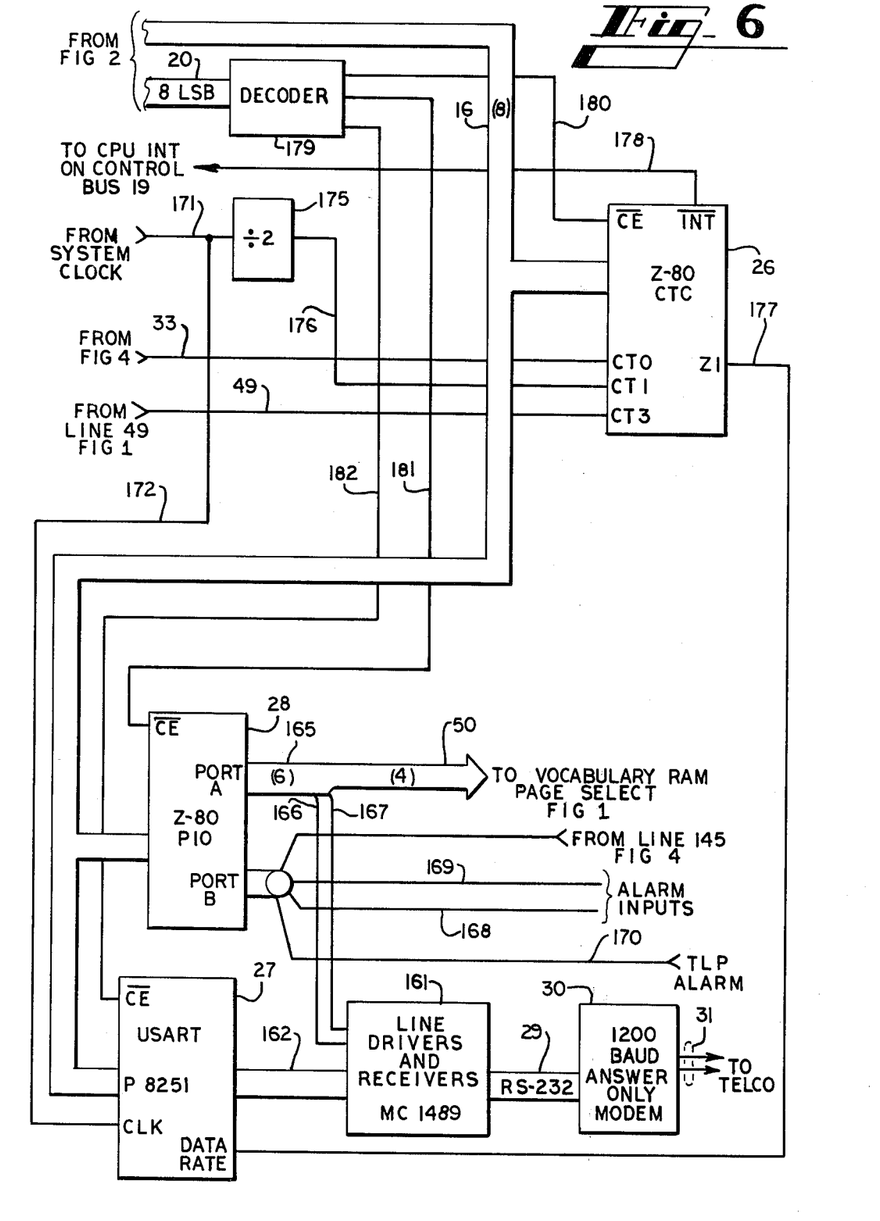
FIG. 6 is a diagram of the connecting arrangement between the preferred embodiment of the present invention and a voice grade telephone line for remote servicing as well as a portion of the transducing arrangement for maintaining track of time and temperature.

FIG. 6 shows in further detail the connection of some of the peripherals shown in FIG. 1 to the system. As previously indicated, modem 30 is connected via RS-232 link 29 through conventional line drivers and receivers 161 through an eleven bit bus 162 which is connected to USART 27. Z-80 PIO chip 28 is of the same type as PIO chip 28 shown in FIG. 1. PIO chip 28 is used to provide additional communication functions from CPU 15 along data bus 16 to other devices in the system. Six lines at port A appearing at 165 are brought out from PIO 28, four of which appear as four-bit bus 50 to the page select inputs of vocabulary RAM 32 (FIG. 1). Thus, it will be appreciated that an appropriate word from data bus 16 is loaded into PIO 28 and directed to four bits 50 of port A output 165 during the portion of time that CPU 15 is servicing FIFO 35 by loading additional blocks of data. It will readily be appreciated that one particular four bit page number will be adequate for any particular loading of the FIFO, and thus the word loaded on bus 50 will suffice to select a page from vocabulary RAM 32 while the normal sixteen-bit address bus 20 is selecting individual words to be provided to the FIFO.

Two additional lines 166 and 167 from port A 165 are provided to conrol the direction of line drivers and receivers 161 which are preferably embodied as type MC1489 line drivers and receivers currently manufactured by Motorola.

Three alarm inputs on lines 168–170 are provided to the input of port B of PIO 28. Line 170 is a conventional traffic load protect (TLP) alarm which is generated by traffic monitor and VCA block 45 (FIG. 1) indicating that a predetermined percentage of the available trunks are being used and that the message being provided thereto should be truncated in order to make sure that all incoming calls are answered. Alarm input lines 168 and 169 are conventional alarm inputs indicative of a malfunction of the system.

Also connected to port B of PIO 28 is line 145 which, as described hereinabove, carries the FIFO interrupt signal to be provided to the CPU. While the connections are apparent to those skilled in the art and not shown in FIG. 6, it will be understood that the Z-80 chip set provides a daisy chain arrangement for providing priorities of interrupts and that the interrupt signal generated by PIO 28 in response to a pulse on line 145 will have an appropriate priority to assure that FIFO 35 is never emptied. As may be seen from FIG. 6, an input from the system clock (not shown) appears on line 171 and is provided along line 172 to the clock input of USART 27. The system clock signal is also divided by two by flip-flop 175, which provides one input at CT1 on line 176 to Z-80 counter timer control chip (CTC) 26.

As will be appreciated by those skilled in the art, counter timer chip 26 is a chip of the Z-80 chip set which is used to count pulses appearing at its CT0 through CT3 inputs, or to count the amount of time between successive pulses on these inputs. The particular function for each of these inputs is dictated by internal latches which are loaded under CPU control from data bus 16.

The Z1 output associated with the CT1 input on line 176 appears on line 177 and is provided to the data rate control input of USART 27. The 3840 hertz signal on line 32 is provided to the CT0 input of CTC chip 26, and thus CTC chip 26 further performs a scaling function for this time signal which, it should be recalled, is derived from precision oscillator 129 (FIG. 4).

The temperature signal on line 49 (FIG. 1) is provided to the CT3 input of CTC chip 26 and is counted for predetermined periods at regular intervals by the CPU in order to ascertain the outside temperature as detected by RTD 40 (FIG. 1).

An interrupt output from CTC chip 26 is shown on line 178, which will be understood to be provided to an interrupt input to CPU 15 on control bus 19 (FIG. 2) to indicate to the CPU when one of the timing or counting functions of CTC chip has been completed.

Lastly, from FIG. 6 it will be appreciated that the eight least significant bits of address bus 20 are provided to an address decoder 179, the outputs of which appear on lines 180–182 to select one of peripherals 26–28. While not shown in the drawing, it is to be understood that the control function of input/output request (IORQ) from CPU 15 is used to enable decoder 179 as used to control reading of data from data bus 16 from one of the peripherals selected by decoder 179 in a conventional manner.

From the foregoing detailed description of the preferred embodiment, it will be appreciated that this embodiment accomplishes the above noted objects of the present invention. From the teachings herein it will be understood by those skilled in the art that other embodiments of the present invention will readily suggest themselves and therefore the scope of the present invention is to be limited only by the claims below.

We claim:

1. In an automatic time of day announcement system for providing time of day announcements to at least one telephone truck in response to an incoming call, including a clock comprising time base means for providing a time base signal of nominally constant frequency and scaling means for dividing said time base signal by a scale to provide a time of day signal stored in a time of day register, the improvement comprising:

interface means for connecting a control trunk and said clock means in response to a first sequence of pre-determined signals provided on said control trunk from a remote location; and scale correcting means responsive to a second sequence of predetermined signals occurring on said control trunk subsequent to said interface means connecting said clock means, to change said scale of said scaling means.

2. In an automatic time of day announcement system for providing time of day announcements to at least one telephone trunk in response to an incoming call, including clock means for generating a time of day signal and storing said time of day signal in a time of day register, the improvement comprising:

interface means for connecting a control trunk to said clock means in response to a first sequence of predetermined signals provided on said control trunk from a remote location; and correcting means including a flag means for storing a flag signal in response to a second sequence of predetermined signals occurring on said control trunk subsequent to said interface means connecting said control trunk and said clock means, and for causing a predetermined change in the contents of said time of day register in response to the presence of said flag signal upon an occurrence of a predetermined value being provided by said clock means to said time of day register.

* * * * *